US012778328B2

(12) United States Patent
Bloom

(10) Patent No.: US 12,778,328 B2
(45) Date of Patent: Nov. 3, 2026

(54) DRINKING VESSEL

(71) Applicant: Spearmark Holdings Limited, London (GB)

(72) Inventor: Terence Anthony Bloom, London (GB)

(73) Assignee: Spearmark Holdings Limited, London (GB)

( * ) Notice: Subject to any disclaimer, the term of this patent is extended or adjusted under 35 U.S.C. 154(b) by 195 days.

(21) Appl. No.: 18/290,719

(22) PCT Filed: Aug. 2, 2022

(86) PCT No.: PCT/EP2022/071721

§ 371 (c)(1),
(2) Date: Jan. 19, 2024

(87) PCT Pub. No.: WO2023/012171

PCT Pub. Date: Feb. 9, 2023

(65) Prior Publication Data

US 2024/0251976 A1 Aug. 1, 2024

(30) Foreign Application Priority Data

Aug. 6, 2021 (GB) ...................................... 2111360

(51) Int. Cl.
*A47G 19/22* (2006.01)
*G01F 23/20* (2006.01)
*G01G 19/52* (2006.01)

(52) U.S. Cl.
CPC ......... *A47G 19/2227* (2013.01); *G01F 23/20* (2013.01); *G01G 19/52* (2013.01)

(58) Field of Classification Search
CPC ........ A47G 19/2227; A47G 2019/2244; A47G 2200/22; A47G 2200/223; A47G 2200/226
(Continued)

(56) References Cited

U.S. PATENT DOCUMENTS 5,664,745 A * 9/1997 Hadaway .................. A61J 9/00
215/11.1
2010/0089152 A1 4/2010 Kolada
(Continued)

FOREIGN PATENT DOCUMENTS

CH 716795 5/2021
CN 106923610 7/2017
(Continued)

OTHER PUBLICATIONS

Combined Search and Examination Report, dated Jan. 25, 2022, United Kingdom Patent Application No. GB2111360.0 (8 pgs.).
(Continued)

*Primary Examiner* — Jeffrey R Allen
(74) *Attorney, Agent, or Firm* — Fitch, Even, Tabin & Flannery LLP

(57) ABSTRACT

A drinking vessel comprising (1) i) one or more walls defining a cavity for holding a liquid for consumption; ii) a base (4) upon which the drinking vessel can be stood; and iii) a load cell (50) for measuring the quantity of liquid in the cavity. The load cell comprises, or is rigidly coupled to, a leg (53) that protrudes below the base, such that when the drinking vessel is stood upright on a flat surface, the drinking vessel is supported by the leg and at least a portion of the base.

16 Claims, 10 Drawing Sheets

(58) Field of Classification Search
USPC ........................................................ 220/592.17
See application file for complete search history.

(56) References Cited

U.S. PATENT DOCUMENTS

| | | | | |
|---|---|---|---|---|
| 2016/0150897 | A1 | 6/2016 | Zwarych | |
| 2020/0069090 | A1 | 3/2020 | Bloom | |
| 2022/0218137 | A1 * | 7/2022 | Iverson ................ | G01G 23/365 |

FOREIGN PATENT DOCUMENTS

| | | |
|---|---|---|
| GB | 2499829 | 9/2013 |
| KR | 101204455 | 11/2012 |
| WO | 2015069916 | 5/2015 |
| WO | 2020009613 | 1/2020 |
| WO | 2020223540 | 11/2020 |

OTHER PUBLICATIONS

Examination Report, dated Nov. 20, 2023, United Kingdom Patent Application No. GB2111360.0 (8 pgs.).

International Search Report and Written Opinion date of mailing Nov. 16, 2022, International Application No. PCT/EP2022/071721 (8 pgs.).

"Why HidrateSpark Works—Bluetooth Water Bottle—Hidrate Inc", excerpt from https://web.archive.org/web/20210614232856/https:/hidratespark.com/, with an archive date of Jun. 14, 2021, bearing a copyright date of 2020 (3 pgs.).

"Hydracare Product_Aquarate", excerpt from https://web.archive.org/web/20210616073349/https:/www.aquarate.com/, with an archive date of Jun. 16, 2021, bearing a copyright date of 2020 (1 pg.).

"H2OPal Smart Water Bottle Hydration Tracker", excerpt from https://web.archive.org/web/20210623153347/https:/www.h2opal.com/, with an archive date of Jun. 23, 2021, bearing a copyright date of 2021 (5 pgs.).

MySense Kettle Plug Sensor, transcript and screenshots from https://www.youtube.com/watch?v=aDxiuXmivPg, believed to have been uploaded to youtube on Nov. 26, 2020 (4 pgs.).

* cited by examiner

DRINKING VESSEL

CROSS REFERENCE TO RELATED APPLICATIONS

This application is a U.S. national phase application of International Application No. PCT/EP2022/071721, filed Aug. 2, 2022, which claims benefit from United Kingdom Application 2111360.0, filed Aug. 6, 2021, which are each hereby incorporated herein by reference in their entirety.

FIELD

The present disclosure relates to a drinking vessel. In particular, it relates to a drinking vessel associated with the aim of monitoring the fluid intake of a user over time.

Background to the Disclosure Adequate hydration is an important part of general well-being. In some contexts and for some people maintaining adequate hydration is more difficult. For some people it may be important to be able to monitor their fluid intake over a period of time. For some people, it may also be useful to provide a reminder for the person to take a drink at intermittent times if their fluid intake is below a certain level.

WO2020/223540A1 describes a smart container that includes a bottle or other container, a load cell, an accelerometer, a processor, and a colored light source. The container may be a liquid container, a pill container, or a food container. The colored light source may include one or more light-emitting diodes (LEDs) which can be programed to emit unique illumination patterns. The container may also include a speaker or motor to emit audio and vibrational notifications. The container provides a method of tracking consumption by a user of a substance held in a container. However, the smart container may be unstable in use due to rocking of the container about its base.

SUMMARY OF THE DISCLOSURE

The present disclosure provides a drinking vessel comprising:

i) one or more walls defining a cavity for holding a liquid for consumption;

ii) a base upon which the drinking vessel can be stood; and iii) a load cell for measuring the quantity of liquid in the cavity;

wherein the load cell comprises, or is rigidly coupled to, a leg that protrudes below the base, such that when the drinking vessel is stood upright on a flat surface, the drinking vessel is supported by the leg and at least a portion of the base.

The load cell may be rigidly mounted to an anchor point that is spatially fixed, in use, relative to the cavity for holding a liquid for consumption.

The load cell may comprise a body having a first end that is rigidly mounted to the anchor point and a second end that is freely cantilevered; wherein the second end comprises, or is rigidly coupled to, the leg.

The base may comprise one or more, preferably two, feet such that when the drinking vessel is stood upright on a flat surface, the drinking vessel is supported by the leg and the one or more feet; and optionally wherein the leg and the one or more feet are arranged about a centre of the base.

The feet of the base may be rigid.

The base may comprise an aperture and the leg may protrude through the aperture in the base.

A flexible membrane may be provided that covers the aperture in the base.

A distal end of the leg may protrude through the aperture sufficiently so as to engage the flexible membrane when the drinking vessel is stood upright on a flat surface and when the drinking vessel is lifted up into the air.

The flexible membrane may continuously apply a strain to the load cell even when the drinking vessel is lifted up into the air.

The flexible membrane may be dome-shaped.

The drinking vessel may comprise a first part and a second part that can be coupled together and decoupled from each other;

the first part comprising the one or more walls defining the cavity for holding a liquid for consumption; and the second part comprising the load cell and the base.

The one or more walls of the first part may further define a lower cavity for receiving at least a portion of the second part when the first part and the second part are coupled together.

The first part and the second part may comprise complementary connection means, optionally screw threads.

The second part may comprise a housing comprising one or more side walls, an upper wall and a lower wall, the lower wall forming the base of the drinking vessel.

The load cell may be spatially fixed relative to the cavity for holding a liquid for consumption when the first part and the second part are coupled together.

The drinking vessel, optionally a second part thereof, may comprise a processor.

The drinking vessel, optionally a second part thereof, may comprise an accelerometer, the load cell and the accelerometer being operably connected to the processor.

The processor may be configured to prevent current flow to the load cell until a movement of the drinking vessel is sensed by the accelerometer.

The processor may be configured to determine the volume of liquid imbibed by calculating a change in weight of the drinking vessel. The processor may be configured to perform the calculation locally 'on-board' the drinking vessel or alternatively to provide raw or part-processed data to an external computing resource that is configured to perform or complete the calculation remotely.

The processor may be configured to perform a weighing operation by receiving and processing signals from the load cell associated with a strain imparted on the load cell by the contact of the leg with a support surface.

The processor may be configured to perform a weighing operation when the processor determines that the drinking vessel has remained motionless for at least a predetermined time period, and/or the processor determines that the drinking vessel is orientated at a specified angle, and/or the processor determines that the drinking vessel has just been placed onto a support surface.

The processor may be configured to detect a fill event when the weight of the drinking vessel increases, optionally by a least a pre-determined amount.

The processor may be configured to detect a spill event when an angular orientation of the drinking vessel exceeds a pre-determined angle within a pre-determined time period after a waking up of the load cell.

The processor may be configured to detect a controlled emptying event when an angular orientation of the drinking vessel exceeds a pre-determined angle, and optionally when this is after a pre-determined time period after a waking up of the load cell.

The drinking vessel, optionally a second part thereof, may comprise one or more light sources, optionally LEDs, operably connected to the processor.

The one or more light sources may be located within an interior of the housing of the second part and may be configured to transmit light through a side wall of the housing.

At least a portion of the second part may be formed from a transparent or translucent material.

The drinking vessel, optionally a second part thereof, may comprise an audio speaker operably connected to the processor.

The drinking vessel, optionally a second part thereof, may comprise a wireless communication means operably connected to the processor.

The load cell may comprise or consist of a strain gauge or a plurality of strain gauges.

The present disclosure also provides a first part for a drinking vessel as described above, wherein the first part comprises the one or more walls defining the cavity for holding a liquid for consumption, and complementary connection means, optionally screw threads, for connecting the first part to a second part.

The present disclosure also provides a second part for a drinking vessel as described above, wherein the second part comprises a base upon which the base can be stood and a load cell; wherein the load cell comprises, or is rigidly coupled to, a leg that protrudes below the base, such that when the base is stood upright on a flat surface, the base is supported by the leg and at least a portion of the base.

Advantageously, the drinking vessel of the present disclosure provides a means for monitoring the fluid intake of a user over time. It may find particular application in the home environment, where a user may not be under professional oversight or input.

Advantageously, the load cell may provide an accurate means for determining the volume of water imbibed. At the same time the drinking vessel is enabled to be stood stably on a flat support surface. In a particularly beneficial embodiment the provision of the leg of the load cell and the one or more fixed feet of the second part enables weighing operations to be performed while maintaining the stability of the drinking vessel.

Advantageously, the domed-shape of the flexible membrane may help to ensure that even small changes in strain are transmitted to the leg and thereby to the load cell. In particular, the doming of the flexible membrane avoids the need for a more rigid side wall of the flexible membrane to first be deflected or compressed axially before a strain change is detected.

In addition, the continuous engagement of the distal end of the leg against the flexible membrane may ensure that there are no air gaps or other tolerance gaps that must be taken up before strain is transmitted towards the load cell.

Advantageously, the combination of the accelerometer and the strain gauge may permit the processor to save power by preventing current flow to the load cell until a movement of the drinking vessel is sensed by the accelerometer. This may also enable the load cell, leg and flexible membrane to be configured such that the load cell is always under strain without premature exhaustion of the power source.

In this and other aspects of the present disclosure, the liquid for consumption may be, as non-limiting examples, water, a beverage or other preparation whether or not they also include solid elements, e.g. soups, tea, coffee, hot chocolate, etc. The term 'liquid' also encompass gels, fluids and pasty substances that may be consumed in a drinkable manner, for example milkshakes, high-fibre supplements, ice slushes, etc. In one preferred use, the drinking vessel of the present disclosure finds application as a water container for drinking water. The drinking vessel may form a hydration apparatus for a patient. The drinking vessel is preferably sized for individual use and to be lifted by one hand. The drinking vessel may by, for example, embodied as a cup, mug, tumbler, or bottle. One or more handles may or may not be provided as part of the drinking vessel. The drinking vessel may have an open mouth or may alternatively be provided with a lid, cap, top or similar closure. The closure, where provided, may be permanently attached to the drinking vessel or removable.

BRIEF DESCRIPTION OF THE DRAWINGS

The present disclosure will now be described, by way of example only, with reference to the accompanying drawings in which.

DETAILED DESCRIPTION

Figure 1:
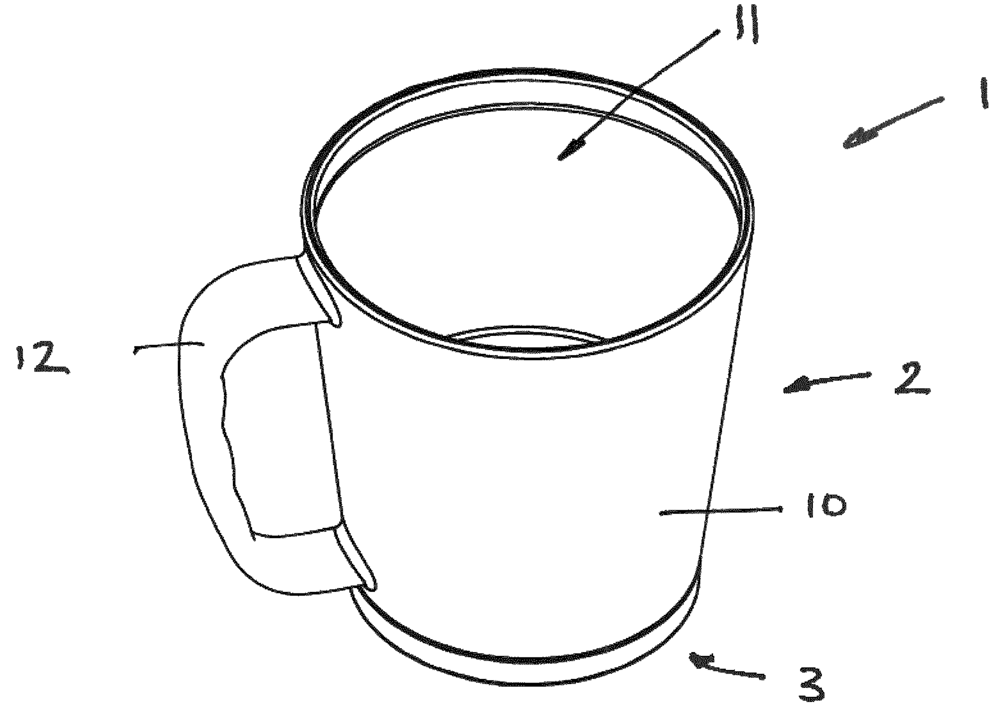
FIG. 1 is a perspective view from above of a drinking vessel according to the present disclosure.

FIGS. 1 to 15 show a drinking vessel 1 according to the present disclosure. The drinking vessel 1 comprises generally one or more walls defining a cavity for holding a liquid for consumption, a base 4 upon which the drinking vessel 1 can be stood, and a load cell 50 for measuring the quantity of liquid in the cavity.

The load cell 50 comprises, or is rigidly coupled to, a leg 53 that protrudes below the base 4, such that when the drinking vessel 1 is stood upright on a flat surface, the drinking vessel 1 is supported by the leg 53 and at least a portion of the base 4.

In more detail, and as shown in FIGS. 1 to 5, the drinking vessel 1 may comprise a first part 2 and a second part 3 that can be coupled together and decoupled from each other. For example, the first part 2 may comprise the one or more walls defining the cavity for holding a liquid for consumption and the second part 3 may comprise the load cell 50 and the base 4.

The first part 2 and the second part 3 may comprise complementary connection means to allow them to be coupled and decoupled. For example, complementary screw threads 15, 25 may be provided on each part, as shown in FIGS. 6 and 7.

The one or more walls of the first part 2 may define the lateral extent of the cavity. The cavity for holding a liquid for consumption may be an upper cavity 11 of the first part 2.

The first part 2 may take various forms. For example, the first part 2 may be configured as a cup, a mug, a tumbler, or a bottle. In the illustrated example of FIGS. 1 to 5 the first part 2 is exemplified as a cup having a handle. Different first parts 2 may be connected to the same second part 3. For example, a first part 2 in the form of a cup and a first part 2 in the form of a tumbler (e.g. without a handle) may be interchangeably connected to the same second part 3.

Figure 6:
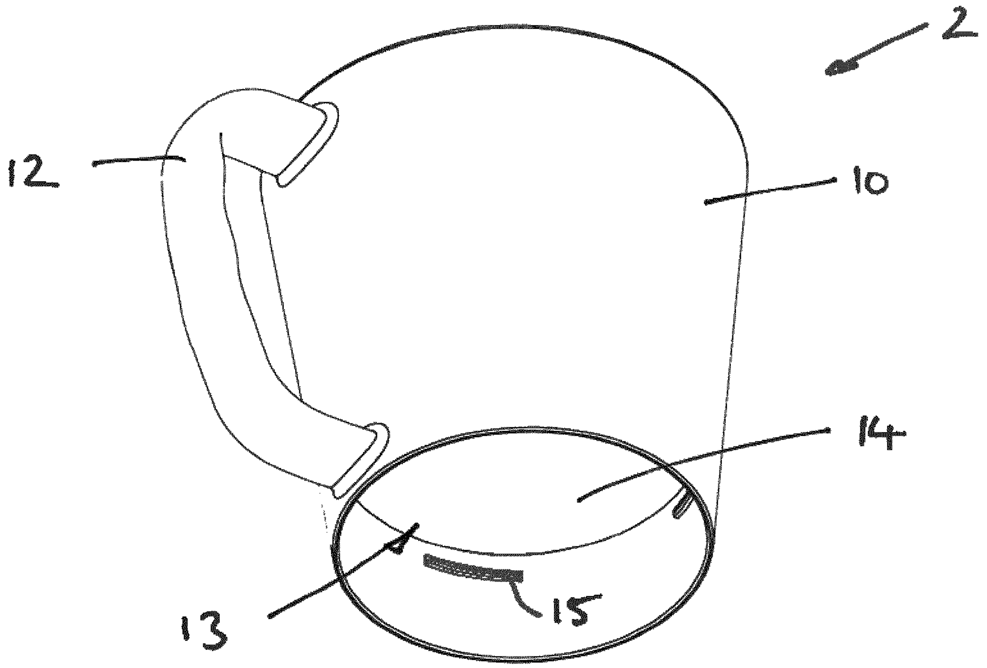
FIG. 6 is a perspective view from below of a first part of the drinking vessel of FIG. 1.
Figure 7:
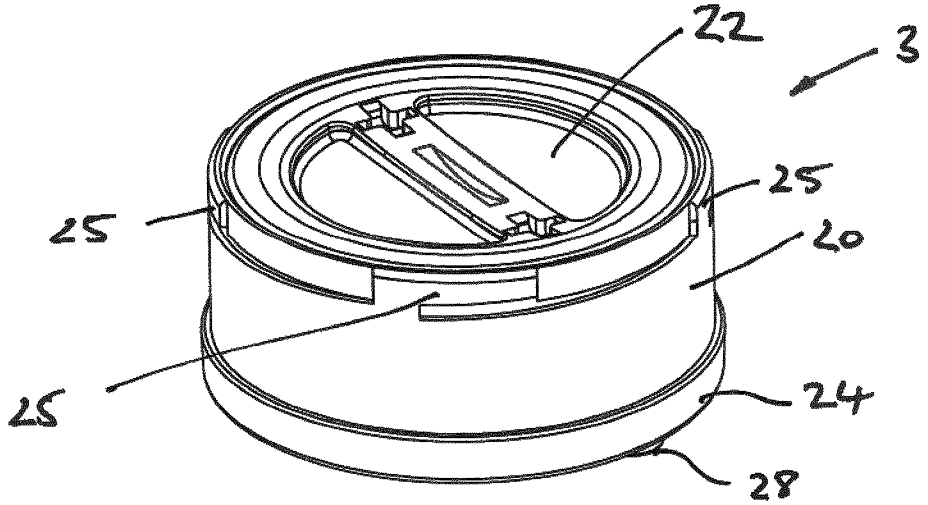
FIG. 7 is a perspective view from above of a second part of the drinking vessel of FIG. 1.

As shown in FIG. 6, the one or more walls of the first part 2 may further define a lower cavity 13 for receiving at least a portion of the second part 3 when the first part 2 and the second part 3 are coupled together. The one or more walls may define the lateral extent of the lower cavity 13. In an alternative arrangement, the first part 2 and the second part 3 may be interconnected together with only a minimal or no axial overlap between the parts, i.e. the first part 2 may be connected so as to reside on top of the second part 3 rather than the second part 3 being substantially received within a cavity of the first part 2.

The one or more walls may comprise one or more side walls 10. Optionally, the one or more side walls 10 comprise a single side wall 10 that may, for example, be cylindrical or frusto-conical in shape. The side wall 10 may have a flared shape such that a diameter of an upper rim is greater than a diameter of a lower rim. A single side wall 10 may define the lateral extent of both the upper cavity 11 and the lower cavity 13.

The lower cavity 13 may comprise one part of the complementary connection means. In the illustrated example, this comprises a plurality of screw thread portions 15 that may be discrete screw thread portions, optionally four screw thread portions which are spaced apart around the periphery of the lower cavity 13.

The one or more walls of the first part 2 may further comprise a partition wall 14 that separates the upper cavity 11 from the lower cavity 13. The partition wall 14 may form a lower wall of the upper cavity 11 and an upper wall of the lower cavity 13.

The first part 2 may optionally be provided with a handle 12 for holding the drinking vessel 1.

The first part 2 may be made of a plastics material. The first part 2 may be formed as a single moulding but could be formed from multiple parts that are assembled together. The first part 2 may be formed from a hard plastics material that is resistant to impacts and scratching. The material may be opaque, transparent or translucent. The material may optionally be free of Bisphenol A (BPA).

The second part 3 may comprise a housing comprising one or more side walls 20, an upper wall 22 and a lower wall 23. The housing may define an interior that contains the load cell 50 (other than that part of the leg 53 that protrudes below the base 4).

The one or more side walls 20, the upper wall 22 and the lower wall 23 may be made of the same or similar material as the first part 2, for example a hard plastics.

Figure 8:
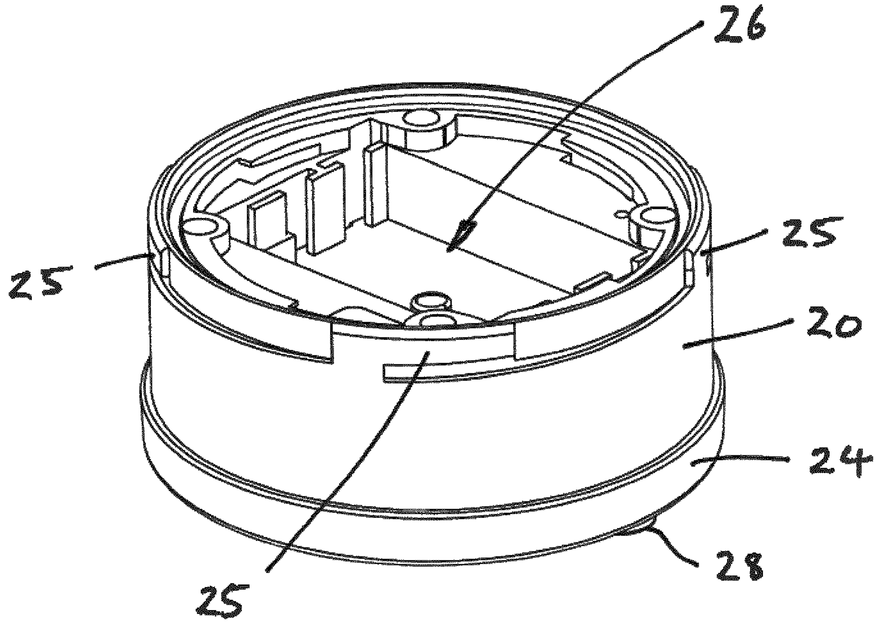
FIG. 8 is a perspective view from above of the second part of FIG. 7 with a battery cover removed.

As shown in FIGS. 7 and 8, the one or more side walls 20 may comprise a single side wall 20 that may, for example, be cylindrical. The side wall 20 may comprise a larger-diameter section 24 adjacent the lower wall 23, as shown in FIG. 7.

Optionally, the second part 3 may be provided with a décor ring that overlies the one or more side walls 20. The décor ring may be used, for example, in embodiments of the drinking vessel 1 where, as noted above, the first part 2 is connected on top of the second part 3 such that a significant portion of the one or more side walls 20 would otherwise be exposed. The décor ring allows for provision of decorative elements such as colours and pictures to be displayed on the second part 3.

The one or more side walls 20 may comprise complementary connection means for coupling to the first part 2. For example, the single side wall 20 may have screw thread portions 25, as shown in FIG. 7, that engage with the screw thread portions 15 provided in the lower cavity 13 on the side wall 10. Where a décor ring is provided this would sit below the level of the screw thread portions 25.

The one or more side walls 20 and the lower wall 23 may together form a cup-shaped element having an open upper mouth that is closed in use by the upper wall 22 to define the interior.

The lower wall 23 may form the base 4 of the drinking vessel 1. For example, the drinking vessel 1 may in part be supported by being rested on a portion of the lower wall 23.

Figure 2:
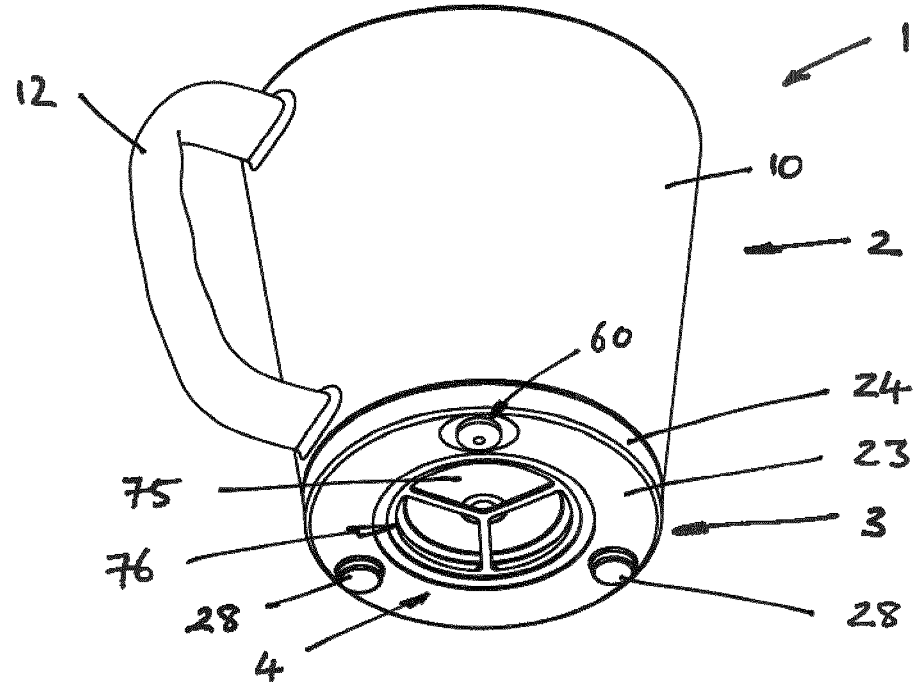
FIG. 2 is a perspective view from below of the drinking vessel of FIG. 1.
Figure 3:
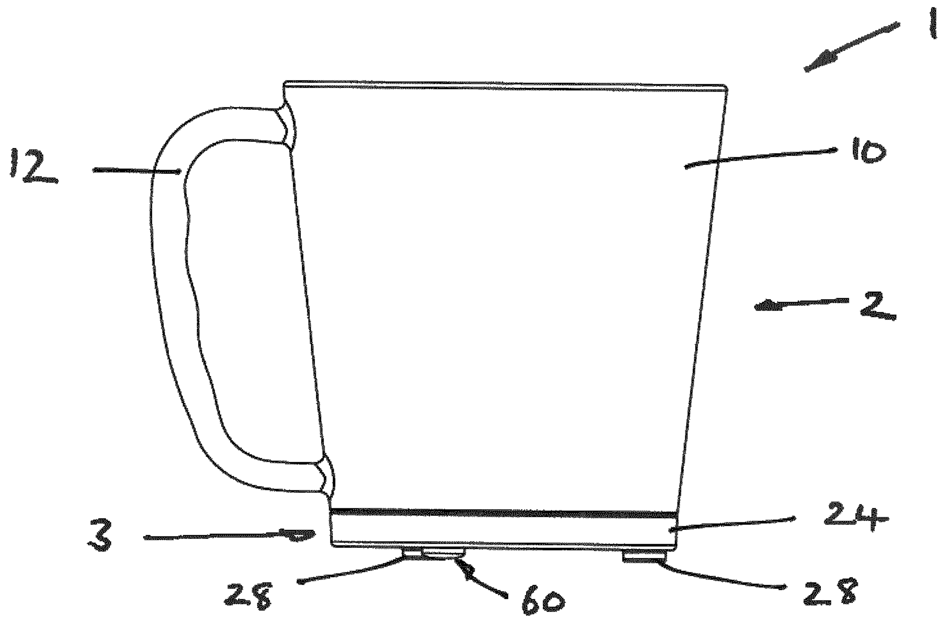
FIG. 3 is a front elevation view of the drinking vessel of FIG. 1.
Figure 4:
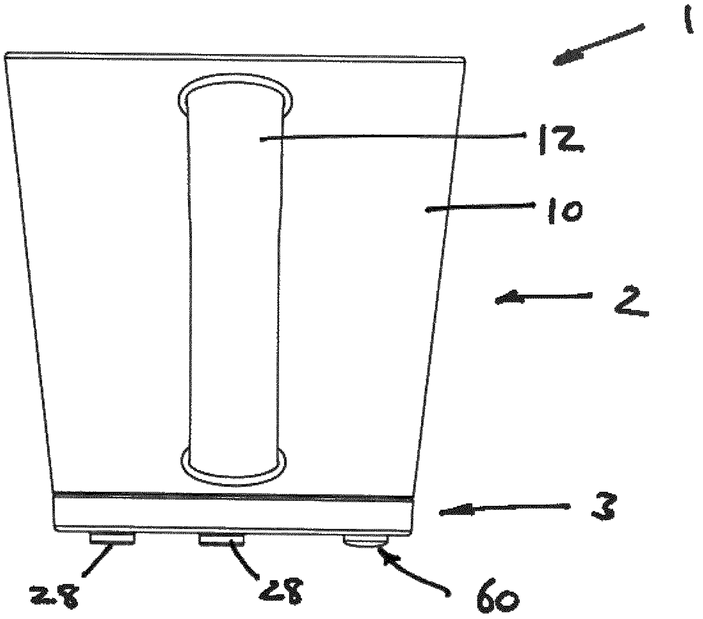
FIG. 4 is a side elevation view of the drinking vessel of FIG. 1.
Figure 5:
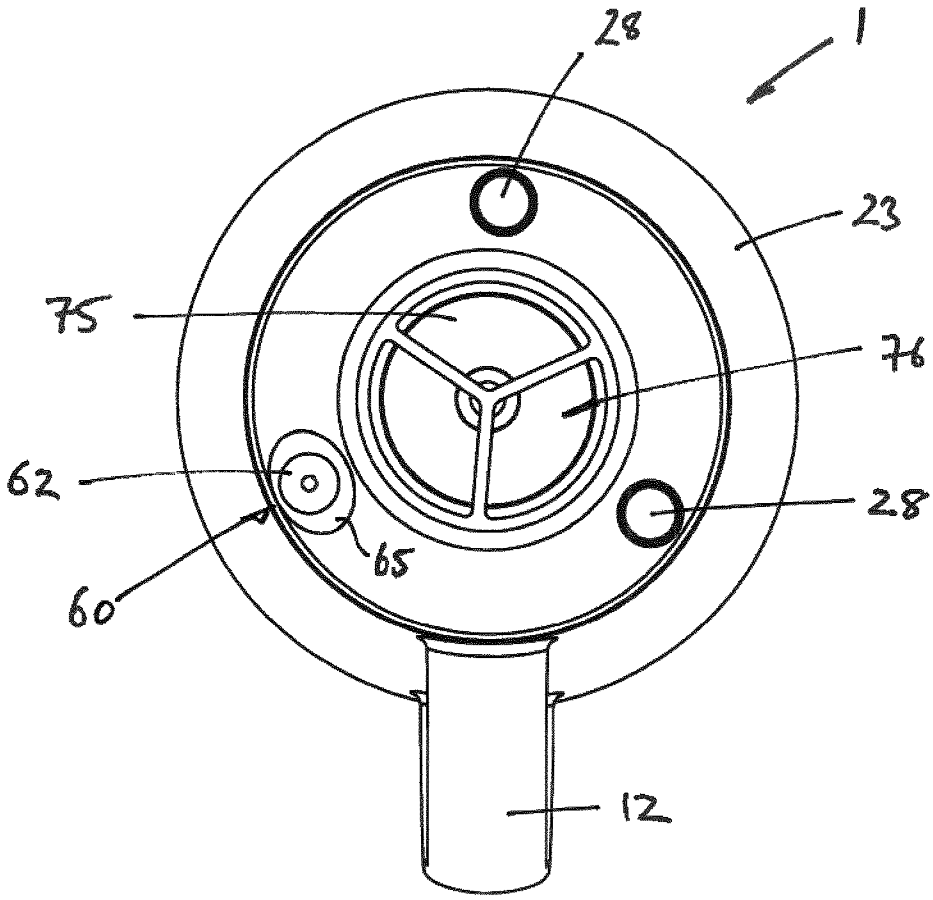
FIG. 5 is a bottom plan view of the drinking vessel of FIG. 1.

As shown in FIGS. 2 and 5, an underside of the lower wall 23 may be provided with a speaker port 76 for emission of audio from a speaker 75 located within the second part 3. The speaker 75 may be an exciter speaker. The speaker port 76 will typically be covered by a membrane (not shown in the Figures) to provide a fluid-tight seal of the lower wall 23. The membrane may be a flexible membrane that can be excited to vibrate by the speaker 75.

The underside of the lower wall 23 may be provided with one or more, preferably two, feet 28 such that when the drinking vessel 1 is stood upright on a flat surface, the drinking vessel 1 is supported by the leg 53 of the load cell 50 and the one or more feet 28. The feet 28 of the lower wall 23 may be rigid.

The feet 28 and the leg 53 raise a remainder of the lower wall 23 off of the support surface to create a gap there between. The gap may function to enhance the quality and/or audibility of the sound produced by the audio waves emanating from the speaker 75.

The leg 53 of the load cell 50 and the one or more feet 28 may be arranged about a centre of the base 4/lower wall 23 and, for example, around the speaker port 76, to enhance the stability of the drinking vessel 1. For example, two feet 28 may be provided which, with the leg 53, form three contact points. The three contact points may form three support points for the drinking vessel 1. The three support points may form a tripod arrangement and may be arranged in a generally triangular manner around a centroid of the lower wall 23. The three support points may be provided near the periphery of the lower wall 23.

The second part 3 may comprise a chassis 30. The chassis 30 may be a rigid chassis 30. The chassis 30 may be installable in the cup-shaped element formed by the one or more side walls 20 and the lower wall 23.

Once the upper wall 22 is affixed to the cup-shaped element, the chassis 30 may be spatially fixed relative to the cup-shaped element, i.e. unable to move at least vertically relative to the lower wall 23. The spatial fixation of the chassis 30 may be achieved by sandwiching the chassis 30 between the lower wall 23 and the upper wall 22 and/or by using fixatives (e.g. bolts, screws, adhesive, welding, etc.) to mount the chassis 30 to either the cup-shaped element or the upper wall 22. The chassis 30 may be a push-fit into the cup-shaped element.

Figure 9:
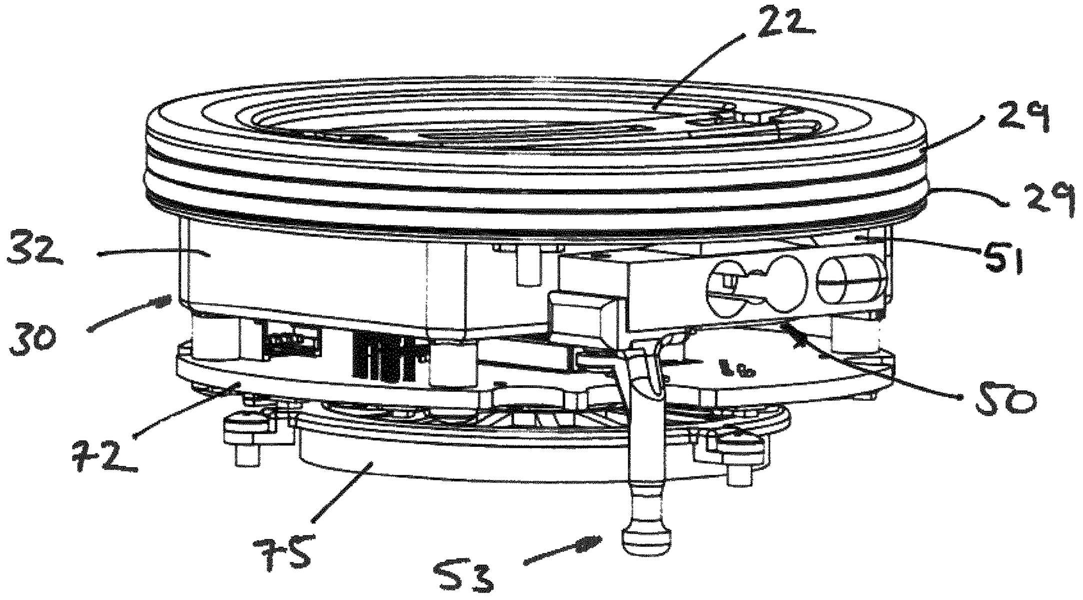
FIGS. 9 to 12 are perspective views of various components of the second part of FIG. 7.
Figure 10:
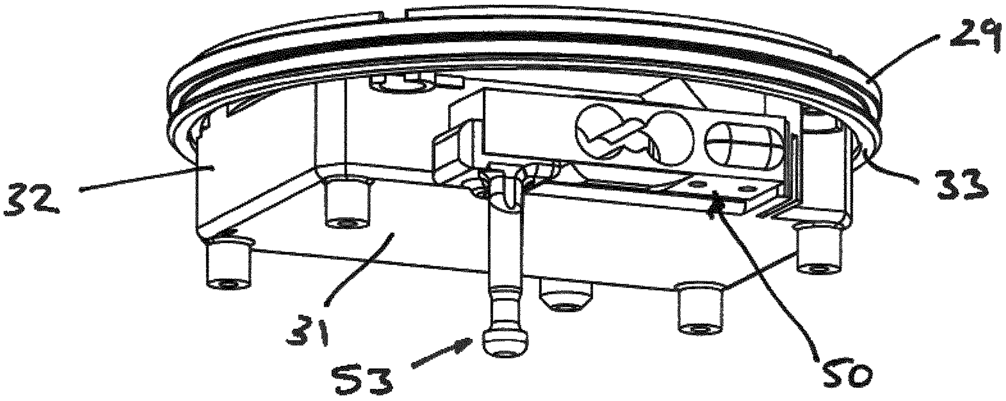
Figure 14:
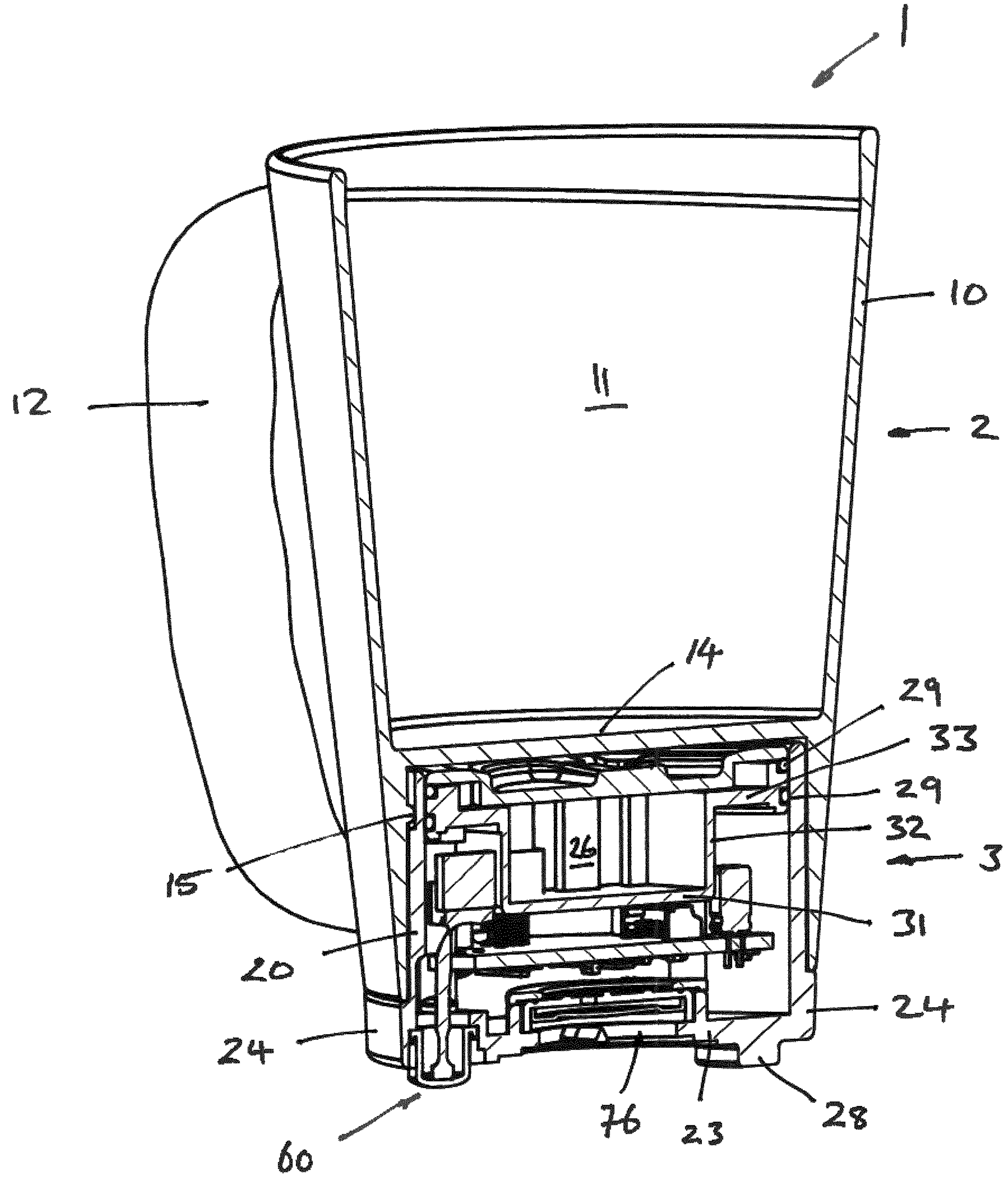
FIG. 14 is a cross-sectional view of the drinking vessel of FIG. 1.

As shown in FIGS. 9 and 10, the chassis 30 may comprise a box-shaped body having a base 31 and side walls 32. Together the base 31 and side walls 32 may define a battery compartment 26, as shown in FIG. 8. As shown in FIG. 14, the chassis 30 may further comprise an upper flange 33 that extends radially outwards from the distal ends of the side walls 32. The distal edge of the upper flange 33 may bear one or more sealing elements 29 for forming a fluid-tight seal with the one or more side walls 20 of the cup-shaped element. The sealing elements 29 may, for example, be O-rings.

The upper wall 22 may function as a detachable cover to allow access to an interior of the housing, for example to allow assembly of the chassis 30 into the cup-shaped element and to permit access to the battery compartment 26.

The upper wall 22 may, for example, comprise complementary connection means for coupling to the cup-shaped element. For example, the upper wall 22 may have a screw thread that engages with a screw thread provided on the side wall. In the illustrated example of FIG. 8, the side wall is provided with a plurality of screw thread portions 25 for engagement with complementary screw thread portions of the upper wall 22.

The load cell 50 may be rigidly mounted to an anchor point 51. The anchor point 51 may be on the chassis 30. In the illustrated example of FIG. 10, the anchor point 51 is on the underside of the upper flange 33.

Figure 13:
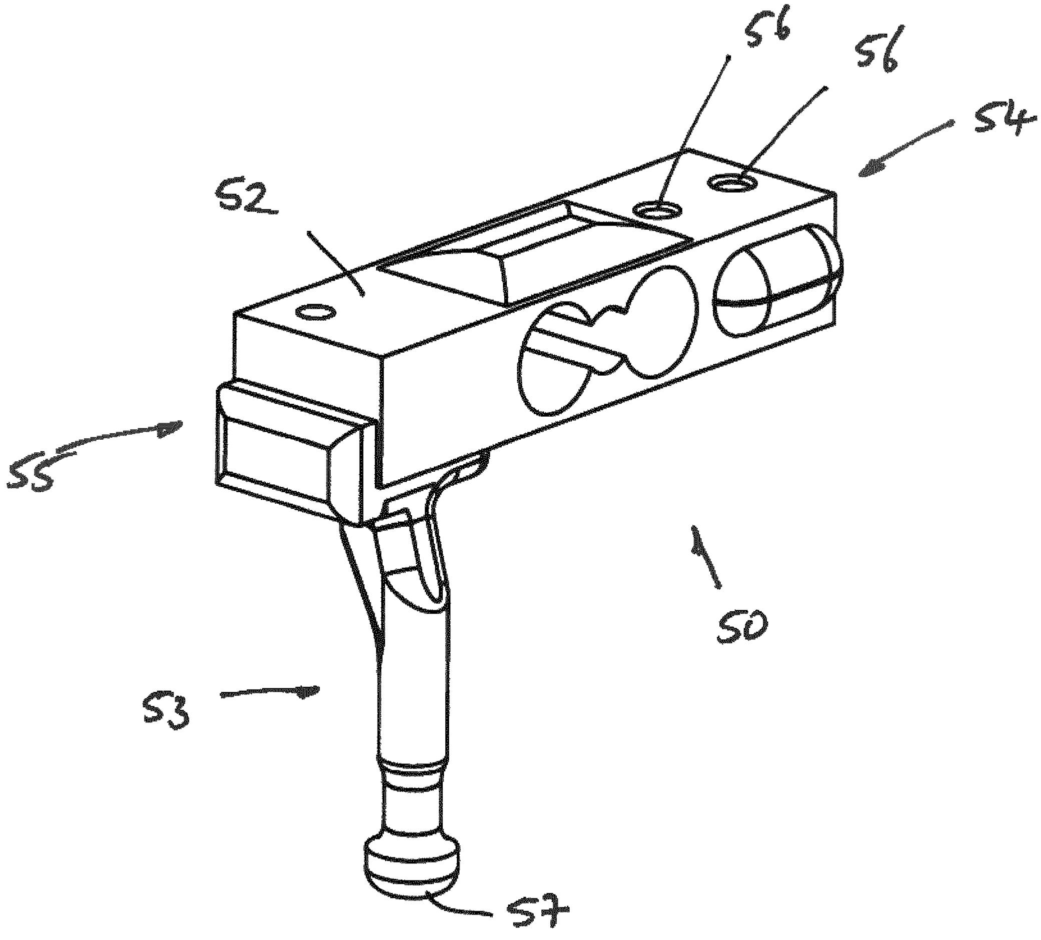
FIG. 13 is a perspective view showing a load cell of the drinking vessel of FIG. 1.

The load cell 50 may comprise, for example one or more strain gauges. In the illustrated example the load cell 50 is of a cantilevered type. As shown in FIG. 13, the load cell 50 comprises a body 52 that may be elongate. The body 52 may be prismatic and may have a generally parallelepiped shape. The body 52 may have a first end 54 and a second end 55. The first end 54 may be mounted in use to the anchor point 51, preferably rigidly mounted. The first end 54 may be provided with means for mounting. For example, the first end 54 may have one or more threaded holes 56 configured to allow bolting of the load cell 50 to the anchor point 51. Alternatively the body 52 may be welded, clamped or otherwise affixed to the anchor point 51.

The second end 55 comprises, or is rigidly coupled to, the leg 53 of the load cell 50. The leg 53 of the load cell 50 may extend downwardly from the second end 55. The leg 53 may be integrally formed with the body 52 or be mounted or affixed to the second end 55 in a rigid manner such that a strain imparted on the leg 53 reliably results in a complementary strain being imparted on the body 52. The leg 53 may extend perpendicularly to the body 52.

The load cell 50 may be spatially fixed, in use, relative to the upper cavity 11 due to the rigid mounting of the body 52 to the anchor point 51 and the spatial fixation of the chassis 30 of the second part 3 within the cup-shaped element and the fixation of the second part 3 to the first part 2 by means of the complementary connections 15, 25.

As shown in FIGS. 2 and 14, the base 4 of the drinking vessel 1 may comprise an aperture and the leg 53 of the load cell 50 may protrude through the aperture in the base 4. The aperture may be provided in the lower wall 23 of the cup-shaped element.

Figure 15:
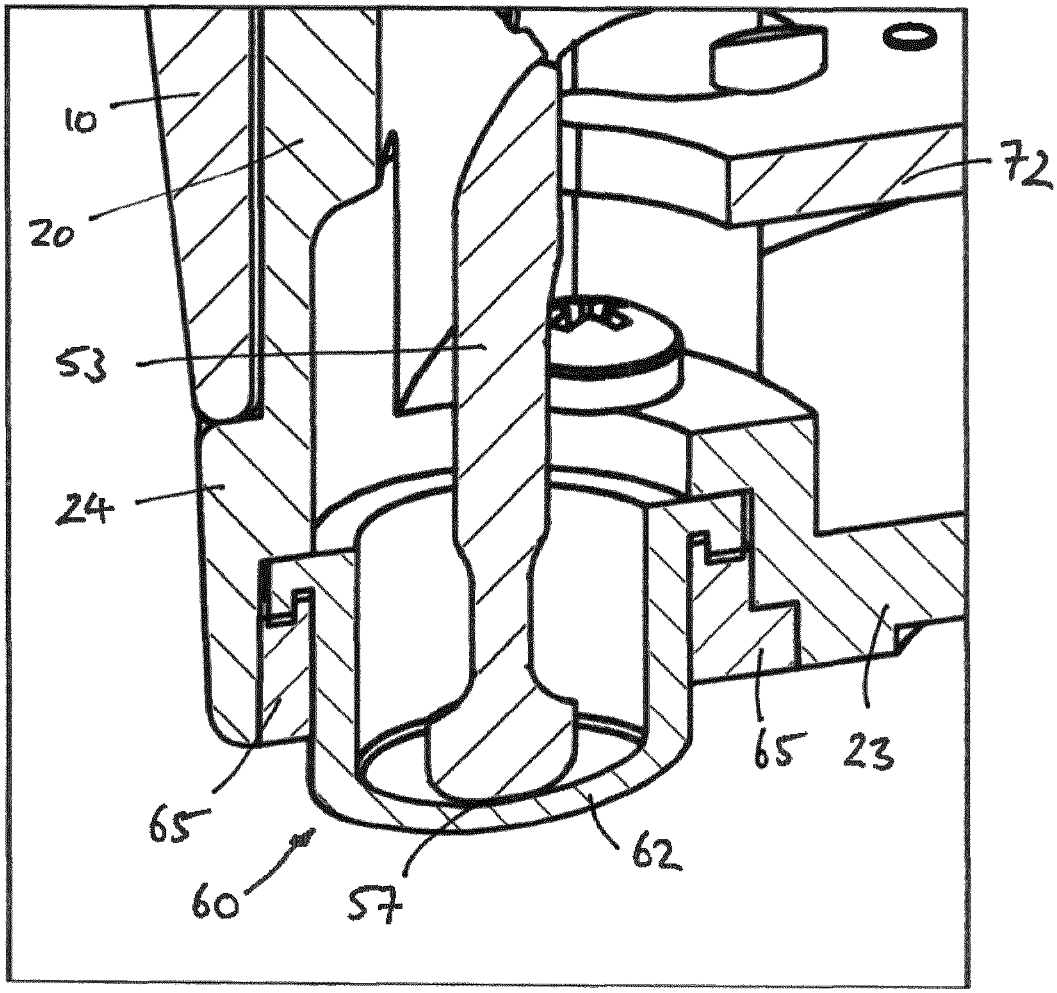
FIG. 15 is an enlarged view of a portion of FIG. 14.

As most clearly shown in FIGS. 14 and 15, a flexible membrane 60 may be provided that covers the aperture in the base 4. The flexible membrane 60 may also cover a distal end of the leg 53 of the load cell 50, i.e. when the drinking vessel 1 is stood on a surface the flexible membrane 60 may be interposed between the leg 53 and the surface. The flexible membrane 60 may provide a liquid-tight, optionally fluid-tight, seal for the aperture to prevent ingress of liquids and/or moisture into the interior of the second part 3.

As shown in FIG. 15, the flexible membrane 60 may be dome-shaped. The flexible membrane 60 may comprise a side wall 61, a domed roof 62 at one end of the side wall 61 and an anchor ring 63 at a distal end of the side wall 61. A locking ring 65 may be provided for fixing the flexible membrane 60 to the lower wall 23. The locking ring 65 may be configured to have a complementary shape to the aperture in the lower wall 23 and to the anchor ring 63 of the flexible membrane 60. The locking ring 65 may be bolted, bonded, welded or otherwise fixed into the aperture in the lower wall 23 to trap the anchor ring 63 of the flexible membrane 60 between the locking ring 65 and the lower wall 23. In an alternative arrangement, the flexible membrane 60 may be otherwise affixed to the lower wall 23, for example by welding, adhesive or by forming the flexible membrane 60 as a co-moulding with the lower wall 23.

In addition, the flexible membrane 60 may function to allow for expansion and contraction of the air sealed within the second part 3. For example, when subjected to a temperature rise, expansion of the air within the second part 3 may be accommodated by outward flexing of the flexible membrane 60. The dome-shape of the flexible membrane may allow for such expansion while maintaining contact between the distal end of the leg 53 and the membrane, e.g. an annular portion of the domed roof 62 of the flexible membrane 60 around the leg 53 may flex to reduce slightly the concavity of the membrane. Provision of the flexible membrane 60 as a temperature compensator may prevent air being pushed and sucked across the annular seal of the O-ring sealing elements 29 when the drinking vessel is subjected to cyclical temperature changes, helping to prevent suction of water into the second part 3.

The flexible membrane 60 may be made, for example, of silicone.

A distal end 57 of the leg 53 may protrude through the aperture, e.g. project below the lower wall 23, sufficiently so as to engage the flexible membrane 60 when the drinking vessel 1 is stood upright on a flat surface and when the drinking vessel 1 is lifted up into the air. Consequently, the flexible membrane 60 may apply continuously a strain to the leg 53 and therefore the load cell 50 even when the drinking vessel 1 is lifted up into the air.

Figure 11:
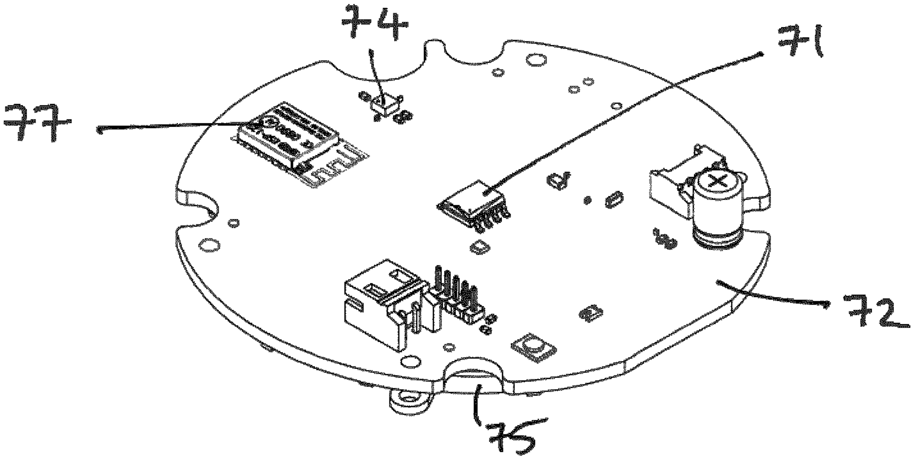
Figure 12:
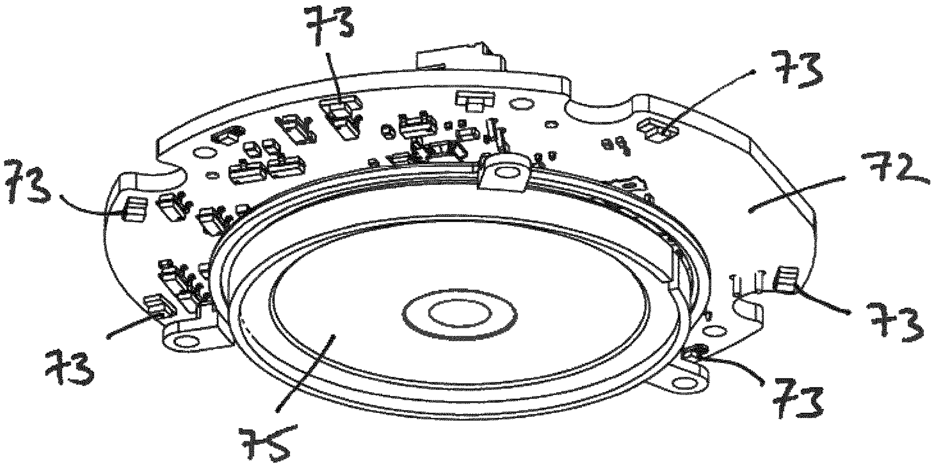

The housing of the second part 3 may further comprise within its interior a PCB 72, as shown for example in FIGS. 11 and 12, that may be mounted to the chassis 30.

The PCB 72 may support and provide operative connections for a processor 71. The processor 71 may control one or more functions of the drinking vessel 1, for example including at least operation and detection of signals from the load cell 50. The processor 71 may receive inputs and generate outputs. The processor 71 may perform computational calculations.

The processor 71 may comprise, for example, a microprocessor and may be operatively connected to a power source and a memory. The power source may comprise batteries provided in the battery compartment 26.

The processor 71 may include a timer function configured to measure time intervals under programmed control. The timer function may provide for the timing of one or a plurality of time intervals.

The housing of the second part 3 may further comprise within its interior an accelerometer 74 or a plurality of accelerometers 74. Each accelerometer 74 may be mounted on the PCB 72. The accelerometer 74 may comprise a three-axis accelerometer 74. The load cell 50 and each accelerometer 74 may be operably connected to the processor 71. As discussed further below, the processor 71 may be configured to use the output of the one or more accelerometers 74 to moderate the use of the load cell 50.

The housing of the second part 3 may further comprise within its interior one or more light sources, for example LEDs 73, as shown in FIG. 12. The light sources may be mounted on the PCB 72 and be operably connected to the processor 71. The light sources may be located within an interior of the housing and configured to transmit light through a side wall and or bottom of the housing. For example, LEDs 73 may be arranged around the periphery of the PCB 72 so as to be adjacent the side wall 20 of the second part 3. The LEDs 73 may be equispaced around the periphery of the PCB 72. At least a portion of the second part 3 may be formed from a transparent or translucent material so as to permit light from the light sources to be emanated from the drinking vessel 1. In the illustrated example of FIG. 14, at least a portion of the cup-shaped member may be transparent or translucent. The side wall 20 may act as a light guide such that light from the light sources is guided along the side wall 20 to be emanated from the larger-diameter section 24 of the side wall 20 and may also be emanated through the lower wall 23.

The LEDs 73 may be configured as visual alert lights. The LEDs 73 may comprise lights of one colour or multiple colours. For example, the LEDs 73 may be colour-changing so as to enable colour-coding of visual messages to a user, e.g. providing emission of green, amber and red light to indicate hydration status.

The housing of the second part 3 may further comprise within its interior an audio speaker 75 that may be operably connected to the processor 71. The audio speaker 75 may be oriented to transmit audio waves downwards towards the lower wall of the second part 3 and/or sideways towards the side wall 20. In particular, the audio speaker 75 may be aligned to emanate audio waves out of the speaker port 76 in the lower wall 23. The audio speaker 75 may be an exciter speaker.

The housing of the second part 3 may further comprise within its interior a wireless communication means 77 operably connected to the processor 71. The wireless communication means 77 may be a wireless transceiver able to perform bidirectional communication between the drinking vessel 1 and a remote resource. The wireless communication means may utilise, for example, Bluetooth, Bluetooth LE, Wi-Fi, Near Field Communications (NFC), Infra-red (IR), 5G, LTE, UMTS, EDGE, GPRS, GSM, or any other form of RF based data communications.

As shown in FIG. 1, with the second part 3 coupled to the first part 2, the drinking vessel 1 comprises a stable integrated unit which may be freely stood on a support surface with the drinking vessel 1 orientated so as to be able to retain liquid within the upper cavity 11.

In use the drinking vessel 1 may be configured to assist a user to keep track of the volume of liquid, for example, water, imbibed. The drinking vessel 1 may additionally or alternatively be configured to prompt a user to imbibe liquid periodically or intermittently during a time period such as a day, a night or a longer period. Additionally or alternatively, the drinking vessel 1 may be configured to prevent over-hydration of a user by either ceasing to issue prompts when a correct hydration level has been reached or by issuing a specific prompt indicating over-hydration.

The processor 71 may be configured to determine the volume of liquid imbibed by using the load cell 50 to calculate the change in weight of the drinking vessel 1. The processor 71 may be configured to perform the calculation locally 'on-board' the drinking vessel 1 or alternatively to provide raw or part-processed data to an external computing resource that is configured to perform or complete the calculation remotely. The external computing resource may be for example a desktop computer, server, cloud-based resource, tablet, PDA, handheld computer, mobile phone, smart watch, or similar.

A 'weighing operation' of the drinking vessel 1 may comprise the processor 71 receiving and processing signals from the load cell 50 associated with the strain imparted on the load cell 50 by the contact of the leg 53 (optionally the domed roof 62 of the flexible membrane 60 covering the leg 53) with the support surface. As will be understood by the skilled person, the greater the volume of liquid in the cavity, the greater the strain imparted on the load cell 50.

Advantageously, the arrangement of the rigid feet 28 and the single leg 53 of the load cell 50 may result in the drinking vessel 1 always being stable when positioned on a flat support surface while still being able to detect reliable signals with the load cell 50.

The skilled person will appreciate that a variety of triggers may be used for determining when to perform a weighing operation. Advantageously, with the drinking vessel 1 of the present disclosure the trigger may utilise the accelerometer 74. For example, the processor 71 may be configured to perform a weighing operation when one or more of the following conditions are satisfied:

- the processor 71 determines that the drinking vessel 1 has remained motionless for at least a predetermined time period.
- the processor 71 determines that the drinking vessel 1 is orientated at a specified angle, for example upright.
- the processor 71 determines that the drinking vessel 1 has just been placed onto a support surface, for example by performing a weighing operation a predetermined number of seconds after the accelerometer 74 indicates that motion of the drinking vessel 1 has stopped subsequent to detecting a lifting or other movement of the drinking vessel 1.

Advantageously, in order to save power (e.g. battery power) the processor 71 may be configured to prevent current flow to the load cell 50 until a movement of the drinking vessel 1 is sensed by the accelerometer 74. For example, when the drinking vessel 1 is left motionless for a period on a flat surface (e.g. on a night stand during the night) the load cell 50 may be 'switched off' by the processor 71 preventing current flow to it. When the drinking vessel 1 is subsequently first lifted the processor 71 may 'wake up' the load cell 50 by switching on the current flow to the load cell 50. When the drinking vessel 1 is then placed back on the flat surface and left still for a minimum period the processor 71 may then perform a weighing operation.

In some embodiments the processor 71 may determine a volume of liquid imbibed by a detected weight change of the drinking vessel 1. For example, the processor 71 may determine that a volume of liquid has been imbibed by detecting a reduction in weight of the drinking vessel 1 between a first weighing operation and a subsequent second weighing operation.

Once the volume of liquid imbibed in a discrete period has been calculated it may be used to track a total volume imbibed over a longer period. In other words, the volumes detected may be aggregated. Aggregation may be performed on-board the drinking vessel 1 and/or on the external computing resource.

Optionally, the processor 71 may be configured to recognise events that are not a user imbibing liquid. For example, such event may include a fill event, a spill event and a controlled emptying event. Such events may be suitably disregarded when tracking the total volume imbibed, e.g. a spill event or a controlled emptying event will not be treated as resulting in any volume of liquid being imbibed. And e.g. an increase in weight between a first weighing operation and a subsequent second weighing operation (e.g. representative of an intermediate filling of the drinking vessel 1) may be used simply to reset the current weight of the drinking vessel 1 ahead of a subsequent third weighing operation.

The processor 71 may detect a fill event when the weight of the drinking vessel 1 increases, optionally by a least a pre-determined amount.

The processor 71 may detect a spill event when an angular orientation of the drinking vessel 1 exceeds a pre-determined angle, or change of angle, within a pre-determined time period. The time period may be measured, for example, from the point in time of an initial movement as detected by the accelerometer 74 (e.g. indicative of the drinking vessel 1 being picked up or first moved).

For example, a longitudinal axis of the drinking vessel 1 may typically be vertical when the drinking vessel 1 is stood on a flat, horizontal surface. In some embodiments, the processor 71 may determine that a spill event has occurred if the angular orientation of the longitudinal axis of the drinking vessel 1 is determined to have reached at least X degrees from the vertical within Y seconds of an initial movement of the drinking vessel 1 as detected by the accelerometer 74. X degrees may be set from 60° to 80°, or from 65° to 75° or at any integer value from 60° to 80°. Y seconds may be set, for example, at from 0.1 to 2 s, or from 0.25 to 2 s, or from 1 to 2 s.

The processor 71 may detect a controlled emptying event (e.g. pouring the contents of the drinking vessel 1 away into a sink) when an angular orientation of the drinking vessel 1 exceeds a pre-determined angle and optionally when this is after a pre-determined time period. The time period may be measured, for example, from the point in time of an initial movement as detected by the accelerometer 74 (e.g. indicative of the drinking vessel 1 being picked up or moved).

For example, in some embodiments the processor 71 may determine that a controlled emptying event has occurred if the angular orientation of the longitudinal axis of the drinking vessel 1 is determined to have reached at least A degrees from the vertical. A degrees may be set from 95° to 135°, or from 110° to 120° or at any integer value from 95° to 135°. Optionally, a controlled emptying may be detected only when it occurs at least B seconds after an initial movement as detected by the accelerometer 74 (e.g. indicative of the drinking vessel 1 being picked up or moved). B seconds may be set, for example, at from 0.5 to 5 s, or from 1 to 5 s, or from 2 to 5 s.

In the above examples, the "initial movement" as detected by the accelerometer 74 may be a first movement following a pre-determined period of motionlessness of the drinking vessel 1 or a movement that is substantially greater in magnitude than preceding movements.

Figure 16:
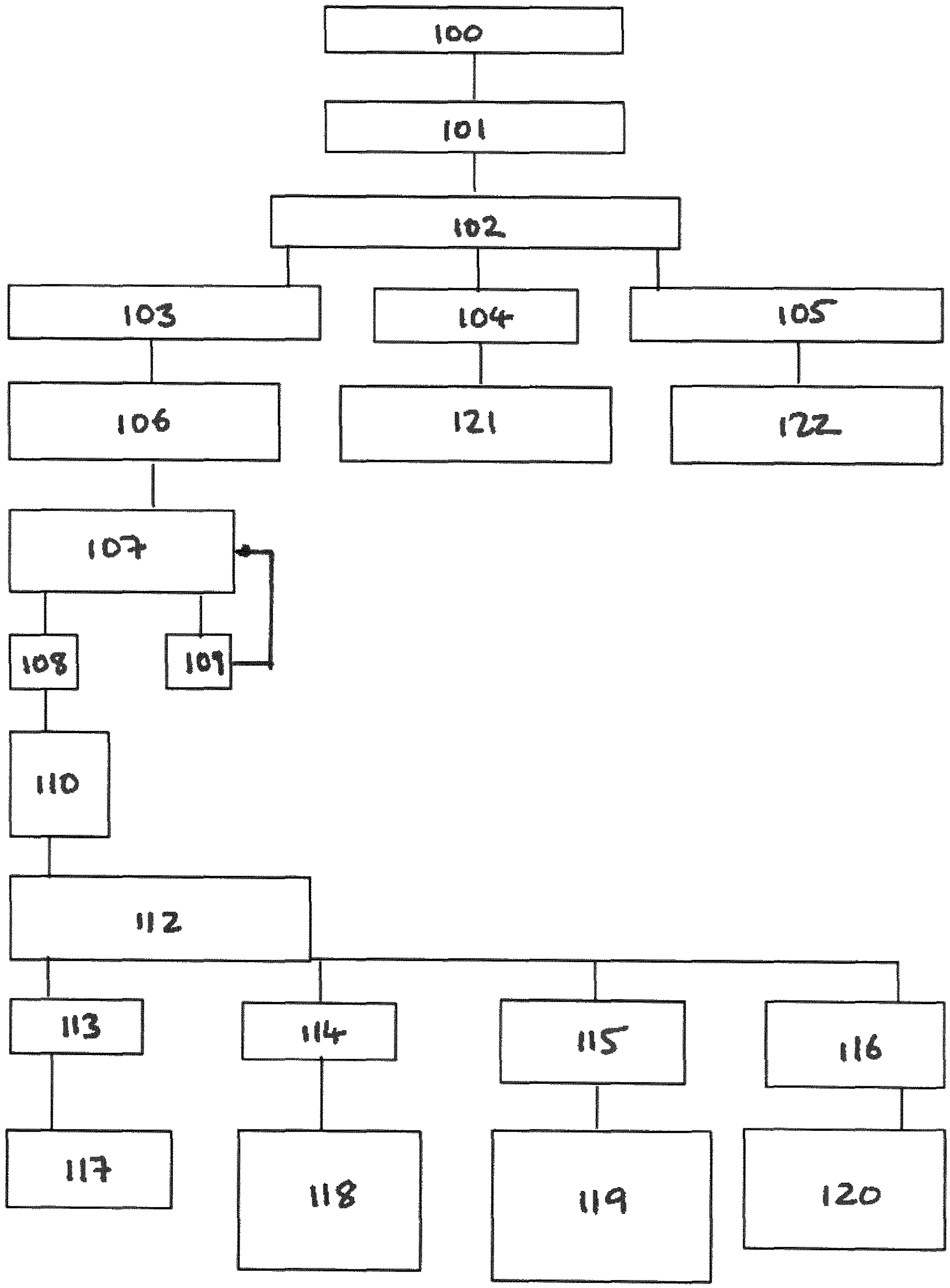
FIG. 16 is a flowchart illustrating an example control scheme for the drinking vessel of FIG. 1.

FIG. 16 is a flowchart illustrating an example control scheme for the drinking vessel 1.

At step 100 the drinking vessel 1 may be initialised and set up. This may include for example connecting the drinking vessel 1 with a remote resource, e.g. a server, by suitable means, e.g. wirelessly.

Starting, for example, from a point where the drinking vessel 1 is stationary and resting on a flat surface, the load cell 50 may be in a sleep mode and receiving no current. At step 101 the drinking vessel 1 undergoes an initial movement, e.g. it is picked up off, or moved on, the flat surface.

At step 102 the speed and angle of movement is detected by the accelerometer 74 and processor 71. In particular, the processor 71 may determine if the angular movement and/or speed and/or other motion characteristics match its pre-determined parameters for a drink event 103 (e.g. a user imbibing liquid) in which case it proceeds to step 106, or a spill event 104 in which case it proceeds to step 121, or a controlled emptying event 105 in which case it proceeds to step 122.

Considering the drink event in more detail, at step 106, the load cell 50 is woken up to start collecting and processing readings, for example strain gauge readings. At step 107 the processor 71 determines if the readings are indicative that the drinking vessel 1 is in a condition to perform a weighing operation, for example are they indicative that the drinking vessel 1 has been placed on a flat surface and remained motionless for at least a predetermined time period, or is the drinking vessel 1 is orientated at a specified angle, for example upright?

If the conditions are acceptable (e.g. the drinking vessel 1 has now been set down on a flat surface) the process moves via step 108 to step 110 in which step the load cell readings are processed in a weighing operation to determine a change in volume of the liquid in the drinking vessel 1 (i.e. the volume of liquid that was imbibed), recorded and stored in memory—on-board and/or at the remote resource.

At step 112 the aggregated volume imbibed for the user in a set period, e.g. that day, may be computed from a plurality of weighing operations over the set period. If the volume is on target 113 (e.g. relative to a pre-determined volume for that user) then the process moves to step 117 where a suitable indication may be given, for example a visual alert, e.g. a green light from the LEDs 73. If the volume is below target 114 then the process moves to step 118 where a suitable indication may be given, for example a visual alert, e.g. an amber light from the LEDs 73. A guidance message may also be sent to the user and a caregiver by an auxiliary route, e.g. SMS text message, or email, etc. If the volume is seriously below target 115 then the process moves to step 119 where a suitable indication may be given, for example a visual alert, e.g. a red light from the LEDs 73. A warning message may also be sent to the user and a caregiver by an auxiliary route, e.g. SMS text message, or email, etc. If the volume is seriously above target 116 (e.g. the user may be over-hydrated) then the process moves to step 120 where a suitable indication may be given, for example a visual alert or absence thereof, e.g. the LEDs 73 may be switched off. A warning message may also be sent to the user and a caregiver by an auxiliary route, e.g. SMS text message, or email, etc.

The process may then revert to step 101.

If the readings from the accelerometer 74 and/or load cell 50 at step 107 indicate that the drinking vessel 1 is not yet in a condition for performing a weighing operation then the process may pass through step 109 and return to step 107 to perform a subsequent check on the condition of the drinking vessel 1. Optionally, step 109 may include a pre-determined waiting period, e.g. of 0.1 s to 5 s.

Considering the spill event in more detail, at step 121, on detection of the spill event the processor 71 may record the occurrence of the spill event and store this in memory—on-board and/or at the remote resource. The spill event may be timestamped with the date and time of the spill event. The total number of spill events may be tracked and/or aggregated over a time period. Aggregation may be performed on-board the drinking vessel 1 and/or on the external computing resource.

After recording the spill event, the process may then revert to step 101.

Considering the controlled emptying event in more detail, at step 122, on detection of the controlled emptying event the processor 71 may optionally record the occurrence of the controlled emptying event in memory—on-board and/or at the remote resource. However, preferably the controlled emptying event is discarded by the processor 71 and not recorded.

After detecting and optionally recording the controlled emptying event, the process may then revert to step 101.

The above control scheme is only presented as an example. The drinking vessel 1 may be configured to detect other events as required.

The LEDs 73 or other light sources may be used during a weighing operation to provide visual feedback, for example, to indicate that a weighing operation is in progress, has been completed, etc.

The audio speaker 75 may, likewise, be used to provide audio feedback.

The light sources and or the audio speaker 75 may be used to prompt a user to take a drink. This may be, for example, by the triggering of flashing lights and/or a sound alert when the processor 71 (or external computing resource) calculates that a drink would be beneficial for a user.

The invention claimed is:

1. A drinking vessel comprising:

i) one or more walls defining a cavity for holding a liquid for consumption;

ii) a base upon which the drinking vessel can be stood; and iii) a load cell for measuring the quantity of liquid in the cavity;

wherein the load cell comprises, or is rigidly coupled to, a leg that protrudes below the base, such that when the drinking vessel is stood upright on a flat surface, the drinking vessel is supported by the leg and at least a portion of the base;

wherein the base comprises an aperture and the leg protrudes through the aperture in the base, the drinking vessel further comprising a flexible membrane that covers the aperture in the base and a distal end of the leg protrudes through the aperture sufficiently so as to engage the flexible membrane when the drinking vessel is stood upright on a flat surface and when the drinking vessel is lifted up into the air;

wherein the flexible membrane continuously applies a strain to the load cell even when the drinking vessel is lifted up into the air;

wherein the base comprises two feet such that when the drinking vessel is stood upright on a flat surface, the drinking vessel is supported by the leg and the two feet.

2. The drinking vessel of claim 1, wherein the load cell is rigidly mounted to an anchor point that is spatially fixed, in use, relative to the cavity for holding a liquid for consumption.

3. The drinking vessel of claim 2, wherein the load cell comprises a body having a first end that is rigidly mounted to the anchor point and a second end that is freely cantilevered; wherein the second end comprises, or is rigidly coupled to, the leg.

4. The drinking vessel of claim 1, wherein the feet of the base are rigid.

5. The drinking vessel of claim 1, wherein the flexible membrane is dome-shaped.

6. The drinking vessel of claim 1, wherein the drinking vessel comprises a first part and a second part that can be coupled together and decoupled from each other;

the first part comprising the one or more walls defining the cavity for holding a liquid for consumption; and the second part comprising the load cell and the base.

7. The drinking vessel of claim 6, wherein the one or more walls of the first part further define a lower cavity for receiving at least a portion of the second part when the first part and the second part are coupled together.

8. The drinking vessel of claim 6, wherein the second part comprises a housing comprising one or more side walls, an upper wall and a lower wall, the lower wall forming the base of the drinking vessel.

9. The drinking vessel of claim 8, wherein the load cell is spatially fixed relative to the cavity for holding a liquid for consumption when the first part and the second part are coupled together.

10. The drinking vessel of claim 1, wherein the drinking vessel comprises a processor, the load cell being operably connected to the processor.

11. The drinking vessel of claim 10, wherein the drinking vessel comprises a wireless communication means operably connected to the processor.

12. A first part for the drinking vessel according to claim 1, wherein the first part comprises the one or more walls defining the cavity for holding a liquid for consumption, and complementary connection means for connecting the first part to a second part comprising the base.

13. The drinking vessel of claim 7, wherein the first part and the second part comprise complementary connection means.

14. The drinking vessel of claim 1, wherein the drinking vessel comprises a processor and an accelerometer, the load cell and the accelerometer being operably connected to the processor.

15. The drinking vessel of claim 14, wherein the processor is configured to prevent current flow to the load cell until a movement of the drinking vessel is sensed by the accelerometer.

16. A second part of a drinking vessel, wherein the second part comprises a base upon which the second part can be stood and a load cell; wherein the load cell comprises, or is rigidly coupled to, a leg that protrudes below the base, such that when the second part is stood upright on a flat surface, the second part is supported by the leg and at least a portion of the base;

wherein the base comprises an aperture and the leg protrudes through the aperture in the base, the second part further comprising a flexible membrane that covers the aperture in the base and a distal end of the leg protrudes through the aperture sufficiently so as to engage the flexible membrane when the second part is stood upright on a flat surface and when the second part is lifted up into the air;

wherein the flexible membrane continuously applies a strain to the load cell even when the second part is lifted up into the air;

wherein the base comprises two feet such that when the second part of the drinking vessel is stood upright on a flat surface, the second part of the drinking vessel is supported by the leg and the two feet.

* * * * *